US008634186B2

(12) United States Patent
Gulick et al.

(10) Patent No.: US 8,634,186 B2
(45) Date of Patent: Jan. 21, 2014

(54) NON-VOLATILE MEMORY CONTROLLER CABLE ARRANGEMENT

(75) Inventors: Dale E. Gulick, Bee Cave, TX (US);
James Foppiano, Austin, TX (US);
David G. Selig, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 415 days.

(21) Appl. No.: 12/775,601

(22) Filed: May 7, 2010

(65) Prior Publication Data

US 2011/0273829 A1    Nov. 10, 2011

(51) Int. Cl.
*H05K 5/00* (2006.01)
*H05K 7/00* (2006.01)
*H05K 7/10* (2006.01)
*G06F 1/16* (2006.01)

(52) U.S. Cl.
USPC ............... 361/679.4; 361/679.45; 710/301; 439/76.1

(58) Field of Classification Search
USPC ................. 361/679.31, 679.4–679.45, 679.6
See application file for complete search history.

(56) References Cited

U.S. PATENT DOCUMENTS

| 5,724,027 | A  | * | 3/1998  | Shipman et al. ........... 726/16 |
| 5,889,987 | A  | * | 3/1999  | Nelson et al. .............. 713/2 |
| 6,246,578 | B1 | * | 6/2001  | Wei et al. ............... 361/679.4 |
| 6,473,355 | B2 | * | 10/2002 | Caulkins ................ 365/228 |
| 6,705,878 | B2 | * | 3/2004  | Liang ................... 439/76.1 |
| 6,724,619 | B2 | * | 4/2004  | Kwong et al. ........ 361/679.33 |
| 6,859,854 | B2 | * | 2/2005  | Kwong ................... 710/315 |
| 7,058,779 | B1 | * | 6/2006  | McClain ................. 711/170 |
| 7,231,487 | B2 | * | 6/2007  | Schillaci et al. ........... 711/1 |
| 7,406,560 | B2 | * | 7/2008  | Bulusu et al. ............ 711/103 |
| 7,490,211 | B2 | * | 2/2009  | Schnepper ............. 711/170 |
| 7,493,437 | B1 | * | 2/2009  | Jones et al. ............. 710/301 |
| 7,877,542 | B2 | * | 1/2011  | Chow et al. ............. 711/103 |
| 8,019,938 | B2 | * | 9/2011  | Flynn et al. ............. 711/113 |
| 2002/0171999 | A1 | * | 11/2002 | Huang ................... 361/600 |
| 2003/0016488 | A1 | * | 1/2003  | Huang ................... 361/683 |
| 2003/0032333 | A1 | * | 2/2003  | Kwong .................. 439/638 |
| 2003/0041284 | A1 | * | 2/2003  | Mambakkam et al. ........ 714/15 |
| 2003/0074499 | A1 | * | 4/2003  | Chen et al. ............... 710/63 |
| 2003/0198015 | A1 | * | 10/2003 | Vogt ..................... 361/686 |
| 2003/0229745 | A1 | * | 12/2003 | Shih .................... 710/301 |
| 2004/0076048 | A1 | * | 4/2004  | Kabenjian et al. .......... 365/200 |
| 2006/0149963 | A1 | * | 7/2006  | Lu et al. ................. 713/151 |
| 2007/0061598 | A1 | * | 3/2007  | Bitton et al. ............. 713/194 |
| 2007/0180177 | A1 | * | 8/2007  | Jones et al. .............. 710/301 |

(Continued)

*Primary Examiner* — Adrian S Wilson
(74) *Attorney, Agent, or Firm* — Volpe and Koenig, P.C.

(57) ABSTRACT

A cable solution which enables a flash controller which is located on a motherboard of an information processing system to be coupled with a memory socket which is located within a passive socket panel. In certain embodiments, a cable and header arrangement is provided for connecting the motherboard to the chassis socket panel card. This arrangement allows the front panel card to be simplified (i.e., to be a passive card). In certain embodiments, the solution uses a cable structure such as that used for integrated drive electronics (IDE) type disk drive cables or an ultra AT attachment (U-ATA) type cable. The cable solution provides a low cost solution which offers multiple performance options for a single cost. For example, the cable solution functions with both a standard memory card socket as well as a high speed memory card. Also, in certain embodiments, the header connections include ground signal paths interposed among the data signal paths. The board header connectors are the same for both the standard and high speed socket configurations, only the cable changes between the standard and high speed configurations.

13 Claims, 5 Drawing Sheets

(56) References Cited

U.S. PATENT DOCUMENTS

| | | | |
|---|---|---|---|
| 2007/0288677 A1* | 12/2007 | Mambakkam et al. | 710/301 |
| 2008/0195814 A1* | 8/2008 | Chuang | 711/115 |
| 2008/0215802 A1* | 9/2008 | Chow et al. | 711/103 |
| 2008/0225494 A1* | 9/2008 | Yang | 361/727 |
| 2009/0132760 A1* | 5/2009 | Flynn et al. | 711/113 |
| 2010/0011128 A1* | 1/2010 | Paycher et al. | 710/1 |
| 2010/0157478 A1* | 6/2010 | Changstrom et al. | 360/131 |
| 2011/0026213 A1* | 2/2011 | Chang et al. | 361/679.31 |

\* cited by examiner

| U-ATA Cable | | Signal | Pin | IDC Cable |
|---|---|---|---|---|
| 1 | | 1 | WP | 1 | 1 |
| | G | 2 | | | |
| 2 | G | 3 | VSS | 2 | 2 |
| | G | 4 | | | |
| 3 | | 5 | CD | 3 | 3 |
| | G | 6 | | | |
| 4 | | 7 | LED | 4 | 4 |
| | G | 8 | | | |
| 5 | | 9 | DAT1 | 5 | 5 |
| | G | 10 | | | |
| 6 | | 11 | VSS | 6 | 6 |
| | G | 12 | | | |
| 7 | | 13 | DAT0 | 7 | 7 |
| | G | 14 | | | |
| 8 | | 15 | VSS | 8 | 8 |
| | G | 16 | | | |
| 9 | | 17 | VSS | 9 | 9 |
| | G | 18 | | | |
| 10 | G | 19 | VSS | 10 | 10 |
| | G | 20 | | | |
| 11 | | 21 | CLK | 11 | 11 |
| | G | 22 | | | |
| 12 | G | 23 | VSS | 12 | 12 |
| | G | 24 | | | |
| 13 | | 25 | VDD | 13 | 13 |
| | G | 26 | | | |
| 14 | | 27 | VDD | 14 | 14 |
| | G | 28 | | | |
| 15 | | 29 | CMD | 15 | 15 |
| | G | 30 | | | |
| 16 | | 31 | VSS | 16 | 16 |
| | G | 32 | | | |
| 17 | | 33 | DAT3 | 17 | 17 |
| | G | 34 | | | |
| 18 | | 35 | VSS | 18 | 18 |
| | G | 36 | | | |
| 19 | G | 37 | VSS | 19 | 19 |
| | G | 38 | | | |
| 20 | | 39 | DAT2 | 20 | 20 |
| | G | 40 | | | |

*Figure 5*

NON-VOLATILE MEMORY CONTROLLER CABLE ARRANGEMENT

BACKGROUND OF THE INVENTION

1. Field of the Invention

The present invention relates to information processing systems and more particularly to non-volatile memory controllers used with information processing systems.

2. Description of the Related Art

The advent of non-volatile (e.g., flash based) memory cards (such as those conforming to the Secure Digital (SD) standard) has complicated the desktop information processing system chassis. Many times the physical chassis (i.e., the case) is manufactured by a different vendor, and sold separately from the motherboard of the information processing system, and they must work together.

It is desirable for some functions to be accessible from the front of the chassis of the information processing system such as a power switch, power and hard drive activity light emitting diodes (LEDs), audio jacks, universal serial bus (USB) connectors. It is desirable for these functions to be located on a simple, low cost, passive printed circuit board (i.e., a printed circuit board which contains no integrated circuits). This passive circuit board is often provided by the chassis vendor as part of the chassis as compared to the motherboard vendor.

Another function that has been more recently added to the list of functions that are desirable to be accessible from the front of the chassis includes a non-volatile memory card connector (e.g., a flash card socket). An issue relating to providing the function of a flash memory socket is that the flash card function usually requires flash controller circuitry (often in the form of a controller integrated circuit directly coupled to the flash memory card socket. If this controller integrated circuit is placed on the motherboard, a specially designed cable is needed to connect the controller circuitry with the flash memory socket. If the controller circuitry is located on the front panel card, the cost and complexity of the function is shifted from the motherboard vendor to the chassis vendor. So, the motherboard vendor could place the relatively expensive controller integrated circuit on the motherboard and hope that the chassis vendor provides a suitable front panel card with the correct connectors and cable, or leave it to the chassis vendor as to whether or not to provide the flash card controller function. Generally the industry has followed the model where the chassis vendor provides the controller function since the chassis vendor can build products with and without the function and price their products accordingly.

As the variety of flash card standards has sorted itself out to a single dominant standard, Secure Digital, it has become viable to integrate this function into the information processing system chipset, thereby locating this function on the motherboard. Accordingly, it has become desirable to provide a low-cost cable connector arrangement which allows a passive flash memory socket board to be coupled to controller circuitry that is located on the motherboard of the information processing system.

SUMMARY OF EMBODIMENTS OF THE INVENTION

In accordance with the present invention, a cable solution is set forth which enables a non-volatile memory controller (such as a flash memory card controller) which is located on a motherboard of an information processing system to be coupled with a memory socket which is located within a passive socket panel. In certain embodiments, a cable and header arrangement is provided for connecting the motherboard to the chassis socket panel card. This arrangement allows the front panel card to be simplified (i.e., to be a passive card). In certain embodiments, the solution uses a cable structure such as that used for integrated drive electronics (IDE) type disk drive cables or for ultra AT attachment (U-ATA) type cables. The cable solution provides a low cost solution which offers multiple performance options for a single cost. For example, the cable solution functions with both a standard memory card socket as well as a high speed memory card. Also, in certain embodiments, the header connections include ground signal paths interposed among the data signal paths. The board header connectors are the same for both the standard and high speed socket configurations, only the cable changes between the standard and high speed configurations.

More specifically, in one embodiment, the invention relates to an information processing system comprising a processor; memory coupled to the processor; an input/output controller coupled to the processor, the input output controller comprising a non-volatile memory controller; and, a passive socket panel coupled to the input/output controller, the passive socket panel comprising a non-volatile memory socket.

In another embodiment, the invention relates to a method for providing an information processing system with a non-volatile memory socket comprising: providing the information processing system with an input/output controller, the input output controller comprising a non-volatile memory controller; providing the information processing system with a passive socket panel, the passive socket panel comprising a non-volatile memory socket; and, coupling the input/output controller to the passive socket panel.

In another embodiment, the invention relates to a cable for coupling a non-volatile controller located on an input/output controller with a non-volatile memory socket located on a passive socket panel. The cable includes a plurality of header connections, the plurality of header connections comprising ground signal paths interposed among data signal paths; and, a plurality of signal paths, the cable being configured so that signal paths contiguous to at least some of the ground electrical connections are also coupled to the respective grounds on the memory card header and the motherboard header.

In another embodiment, the invention relates to a motherboard for an information processing system. The motherboard comprises an input/output controller coupled to the socket for coupling the processor to the motherboard, the input output controller comprising a non-volatile memory controller, and, a passive socket panel header coupled to the input/output controller, the passive socket panel header allowing the input/output controller to be coupled with a passive socket panel, the passive socket panel comprising a non-volatile memory socket.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 shows a diagrammatic representation of a cable for use in connecting a motherboard and front panel of an information processing system as implemented in accordance with an embodiment of the invention.

DETAILED DESCRIPTION

Figure 1:
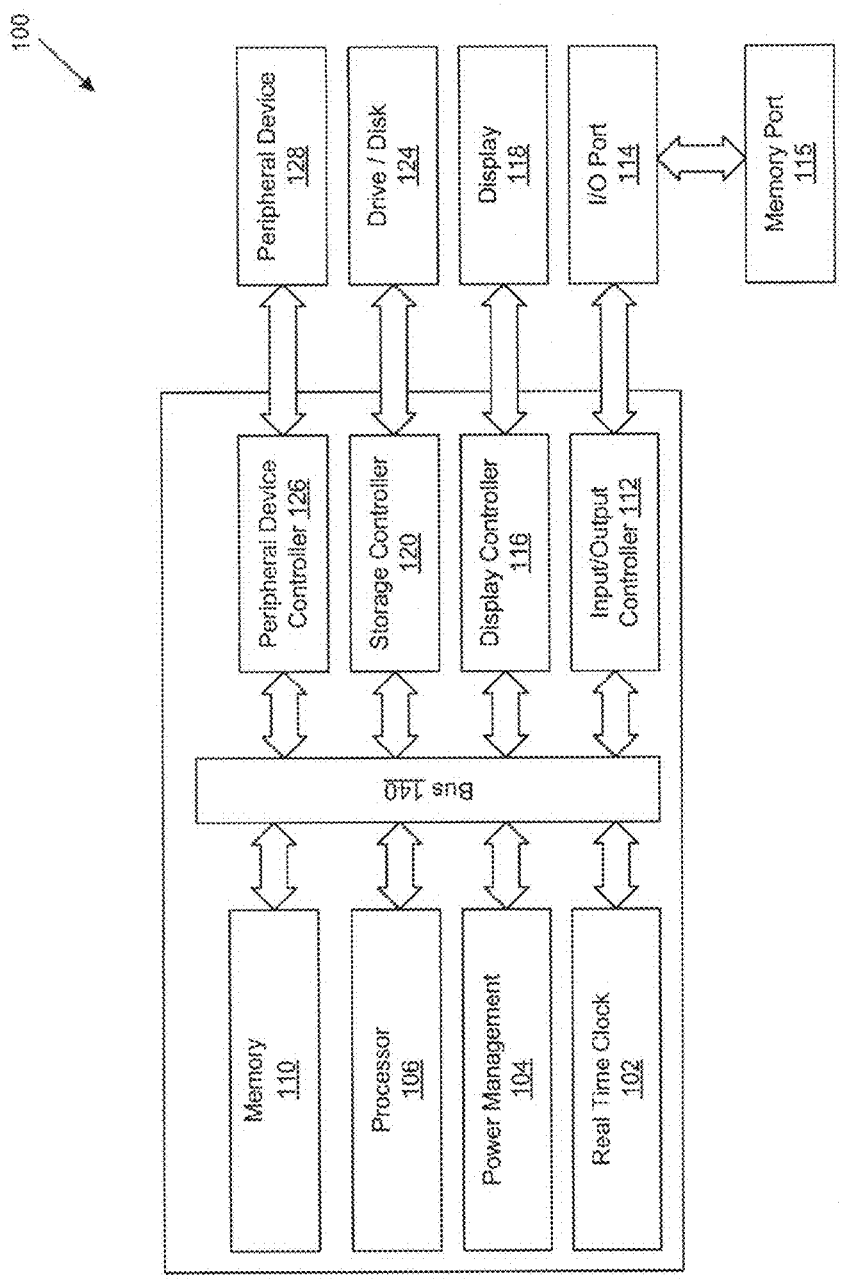
FIG. 1 shows a generalized block diagram of an information processing system as implemented in accordance with an embodiment of the invention.

FIG. 1 is a generalized block diagram illustrating an information processing system 100 as implemented in accordance with an embodiment of the invention. System 100 comprises a real-time clock 102, a power management module 104, a processor 106 and memory 110, all physically coupled via bus 140. In various embodiments, memory 110 comprises volatile random access memory (RAM), non-volatile read-only memory (ROM), non-volatile flash memory, or any combination thereof.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, a memory card port 115 (such as an SD memory card port) or any combination thereof. Display controller 116 is likewise physically coupled to bus 140 and further coupled to display 118. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

Figure 2:
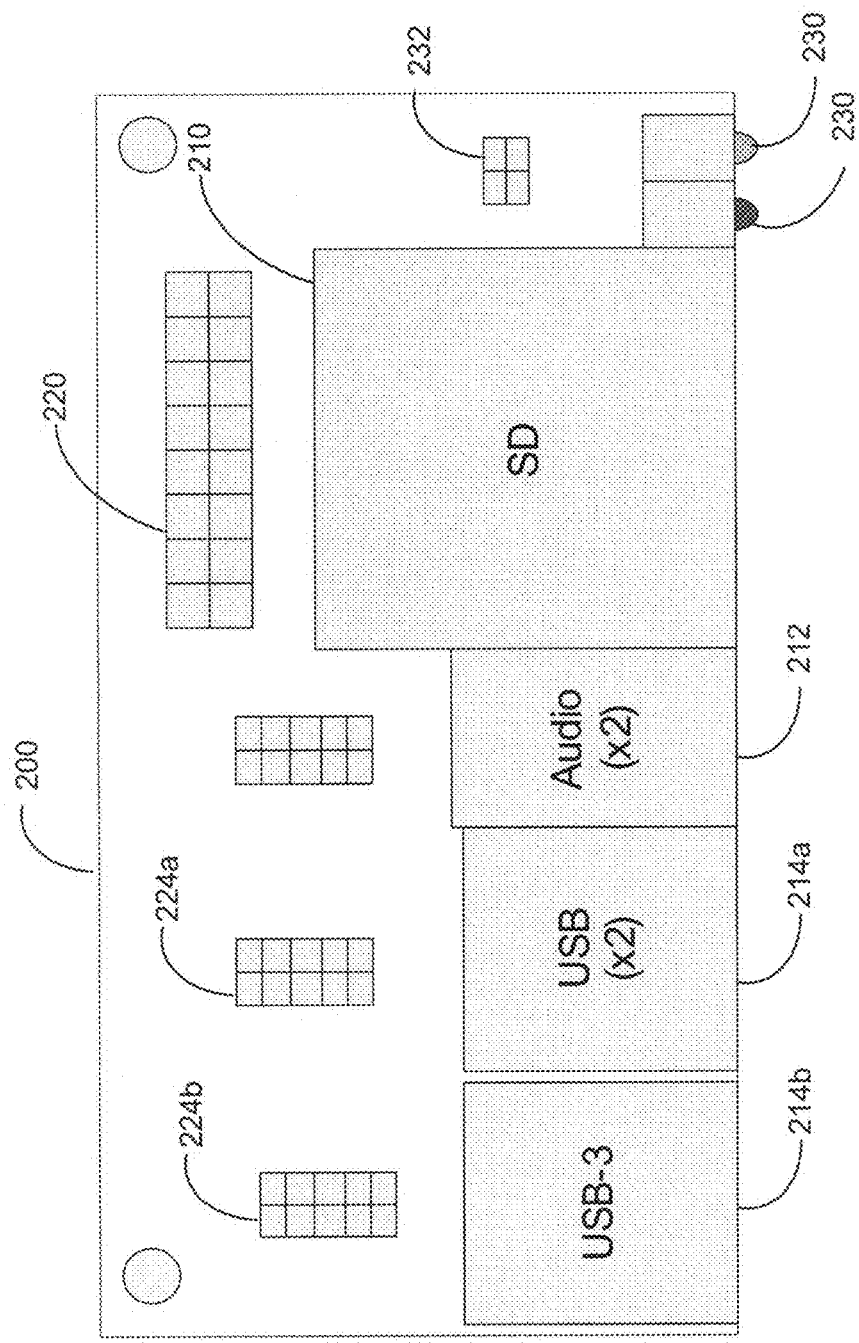
FIG. 2 shows a generalized block diagram of a front panel of an information processing system as implemented in accordance with an embodiment of the invention.

FIG. 2 shows a generalized block diagram of a socket panel 200 of an information processing system 100 as implemented in accordance with an embodiment of the invention. More specifically, the socket panel 200 of the information processing system 100 includes a plurality of sockets as well as respective socket connectors. In certain embodiments, the socket panel 200 includes a memory card socket 210 (such as an SD memory card socket), a plurality of audio sockets 212, and a plurality of USB sockets 214.

The socket panel also includes socket connectors which are electrically coupled with one or more respective sockets. For example, the memory card socket 220 is coupled to a memory card socket connector 220. The audio sockets 212 are coupled to an audio socket connector 222. Two USB sockets 214a are coupled to a USB socket connector 224a and another USB socket 214b is coupled to a USB socket connector 224b.

The socket panel also includes a plurality of indicators 230 such as Light Emitting diodes (LEDs). The socket panel also includes a connector 232 which is electrically coupled to the plurality of indicators 230.

Figure 3:
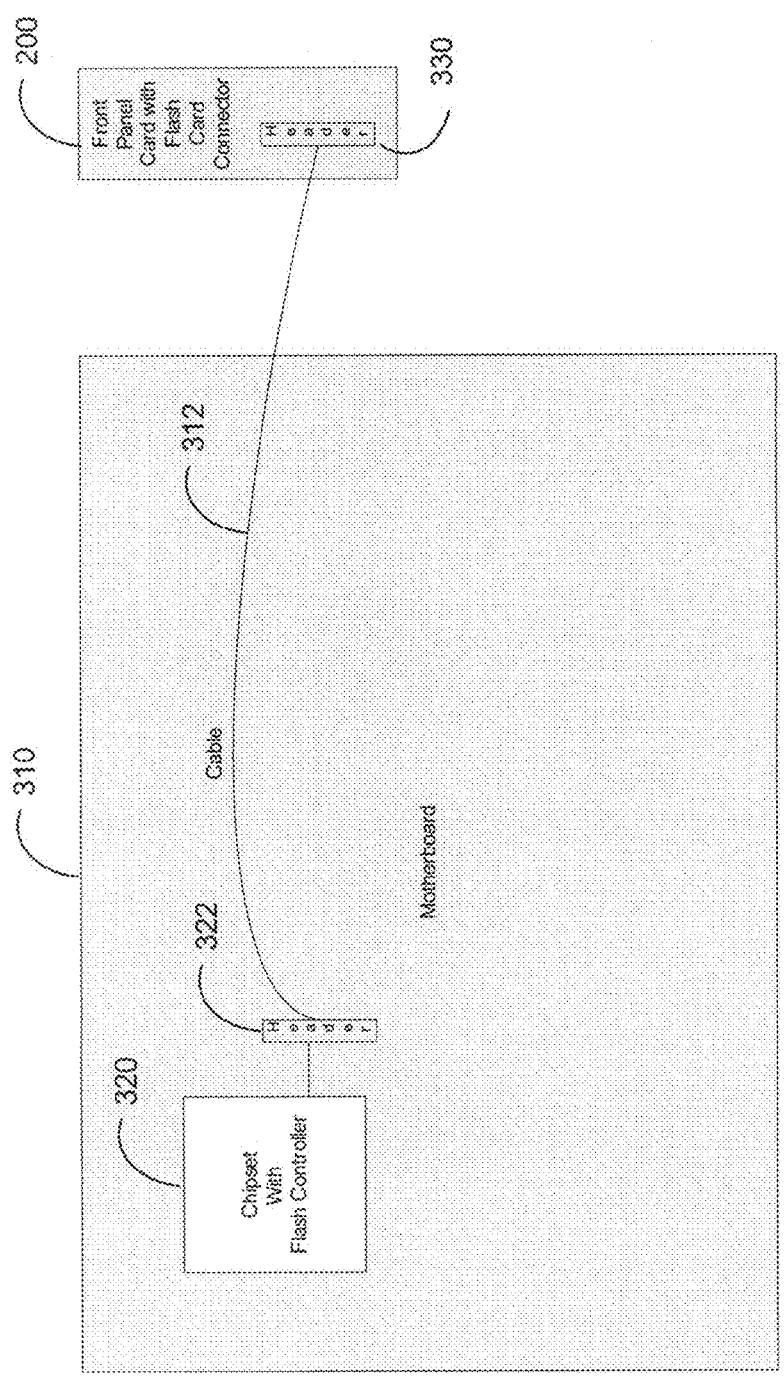
FIG. 3 shows a block diagram of a motherboard and front panel of an information processing system as implemented in accordance with an embodiment of the invention.

FIG. 3 shows a block diagram of a motherboard and front panel of an information processing system as implemented in accordance with an embodiment of the invention. More specifically, the motherboard 310 is coupled to the socket panel 200 via a cable 312. The motherboard includes a chipset 320, which includes a flash memory controller, as well as a header 322 to which the cable 312 is coupled. The socket panel 200 also includes a header 330 to which the other end of the cable 312 is coupled. By providing the chipset 320 with a flash controller it is possible to provide a passive socket panel while still providing a socket into which memory, such as a SD type flash memory, may be coupled.

The cable solution enables a flash controller which is located on a motherboard of an information processing system to be coupled with a memory socket which is located within a passive socket panel. In certain embodiments, the cable and header arrangement connects the motherboard to the chassis socket panel card.

In certain embodiments, the chipset 320 is included within the I/O controller 112 of the information processing system 100. The motherboard 310 further includes one or more other portions, such as the processor 106, the memory 110, etc. of the information processing system 100.

Figure 4:
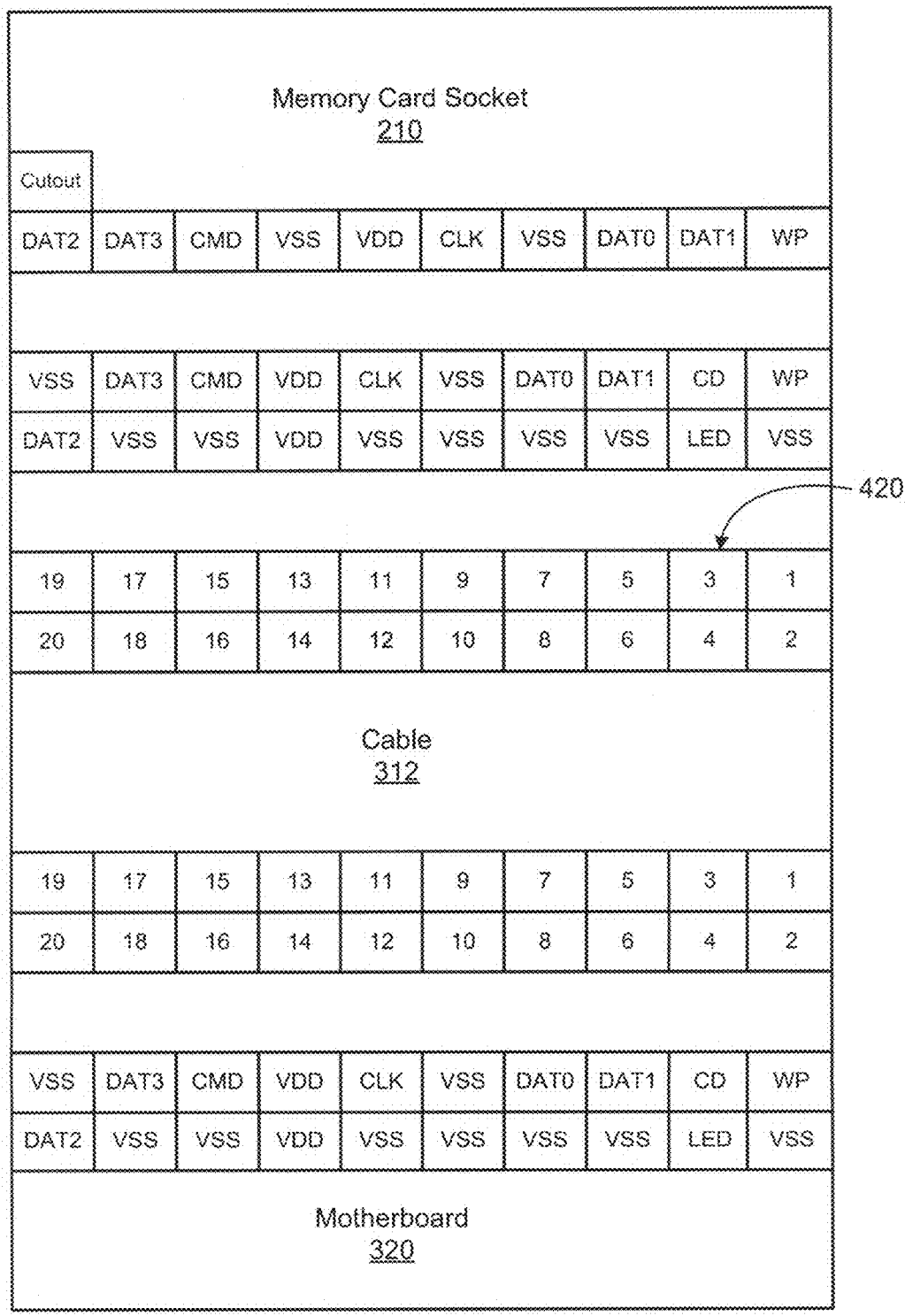
FIG. 4 shows a block diagram of an interconnection between a memory card and a motherboard of an information processing system as implemented in accordance with an embodiment of the invention.

FIG. 4 shows a block diagram of an interconnection between a memory card and a motherboard of an information processing system. The interconnection provides a cable and header arrangement. The cable and header arrangement allows the socket panel card to be simplified (i.e., to be a passive card). In certain embodiments, the solution uses a cable structure such as that used for IDE disk drive cables or for U-ATA type cables. The cable solution provides a low cost solution which offers multiple performance options for a single cost. For example, the cable solution functions with both a standard memory card socket as well as a high speed memory card. Also, in certain embodiments, the header connections include ground signal paths interposed among the data signal paths. The motherboard header connectors are the same for both the standard and high speed socket configurations, only the cable changes between the standard and high speed configurations.

More specifically, the memory card socket 210 includes a plurality of electrical connections which correspond to the memory card to be inserted into the socket. In an embodiment for a SD Flash type of memory card, there are ten electrical connections including a plurality of data electrical connections DAT0, DAT1, DAT2, and DAT3, a command electrical connection CMD, a clock electrical connection CLK, a ground electrical connection VSS, a power electrical connection VDD and a write protect electrical connection WP. The socket electrical connections are coupled to a plurality of electrical connections included within the memory card header 220. In an embodiment of the present invention, there are twenty of electrical connections of the memory card header 220 include a plurality of data electrical connections DAT0, DAT1, DAT2, and DAT3, a command electrical connection CMD, a clock electrical connection CLK, a plurality of ground electrical connections VSS, a power electrical connection VDD and a write protect electrical connection WP. The electrical connections of the memory card header also include an indicator electrical connection LED. For the motherboard header 322, the electrical connections also include twenty of electrical connections (a plurality of data electrical connections DAT0, DAT1, DAT2, and DAT3, a command electrical connection CMD, a clock electrical connection CLK, a plurality of ground electrical connections VSS, a power electrical connection VDD and a write protect electrical connection WP as well as an indicator electrical connection LED).

The twenty electrical connections of the memory card header 220 correspond to a twenty signal cable which includes two, twenty signal connectors 420, 422 for connecting to the memory card header 330 and the motherboard header 332, respectively. In one embodiment, the signal cable, as well as the signal cable connectors, correspond to an IDE disk drive type signal cable.

FIG. 5 shows a diagrammatic representation of an example cable for use in connecting a motherboard and front panel of an information processing system as implemented in accordance with an embodiment of the invention.

In certain embodiments, this example cable includes forty signal paths (such as a U-ATA type cable) where the twenty electrical connections of the memory card header 330 and the motherboard header 332 are coupled to every other signal path of the cable. So for example, the pin 1 of the memory card header is coupled to signal path 1 of the cable, pin 2 of the memory card header is coupled to signal path 3 of the cable, pin 3 of the memory card header is coupled to path 5 of the cable, and so on.

Additionally, certain of the electrical connections which correspond to the grounds (VSS) on the memory card header 330 and the motherboard header 332 are further configured to be coupled to contiguous signal paths of the cable. Thus, the ground electrical connection which corresponds to pin 2 of the header is further coupled to signal path 2 and signal path 4 of the cable. Also, the ground electrical connection which corresponds to pin 10 of the header is further coupled to signal path 18 and signal path 20 of the cable. Also, the ground electrical connection which corresponds to pin 12 of the header is further coupled to signal path 22 and signal path 24 of the cable. Also, the ground electrical connection which corresponds to pin 19 of the header is further coupled to signal path 36 and signal path 38 of the cable. By providing these additional ground signal path connections, the same cable can be used for both standard speed memory cards as well as high speed memory cards.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. An information processing system comprising:
a processor;
memory coupled to the processor;
an input/output controller coupled to the processor, the input output controller comprising a non-volatile memory controller; and,
a passive socket panel coupled to the input/output controller, the passive socket panel comprising a non-volatile memory socket; and wherein
the input/output controller is located on a motherboard of the information processing system;
the passive socket panel is located on a chassis of the information processing system; and,
the input/output controller is coupled to the passive socket panel via a cable; and wherein
the cable further comprises ground electrical connections which correspond to respective grounds (VSS) on a memory card header and a motherboard header; and
the cable is further configured so that signal paths contiguous to at least some of the ground electrical connections are also coupled to the respective grounds on the memory card header and the motherboard header.

2. The information processing system of claim 1 wherein:
the cable conforms at least one of an IDE disk drive type cable and an ultra AT attachment (U-ATA) type cable.

3. The information processing system of claim 1 wherein:
the cable functions with both a standard flash memory card socket as well as a high speed flash memory card socket.

4. The information processing system of claim 1 wherein:
the cable further comprises a plurality of header connections; and,
the header connections comprise ground signal paths interposed among data signal paths.

5. A method for providing an information processing system with a non-volatile memory socket comprising:
providing the information processing system with an input/output controller, the input output controller comprising a non-volatile memory controller;
providing the information processing system with a passive socket panel, the passive socket panel comprising a non-volatile memory socket;
coupling the input/output controller to the passive socket panel;
locating the input/output controller on a motherboard of the information processing system;
locating the passive socket panel on a chassis of the information processing system; and,
the input/output controller is coupled to the passive socket panel via a cable; and wherein
the cable further comprises ground electrical connections which correspond to respective grounds (VSS) on a memory card header and a motherboard header; and
the cable is further configured so that signal paths contiguous to at least some of the ground electrical connections are also coupled to the respective grounds on the memory card header and the motherboard header.

6. The method of claim 5 wherein:
the cable conforms to at least one of an IDE disk drive type cable and an ultra AT attachment (U-ATA) type cable.

7. The method of claim 5 wherein:
the cable functions with both a standard flash memory card socket as well as a high speed flash memory card socket.

8. The method of claim 5 wherein:
the cable further comprises a plurality of header connections; and,
the header connections comprise ground signal paths interposed among data signal paths.

9. A cable for coupling a non-volatile memory controller located on an input/output controller with a non-volatile memory socket located on a passive socket panel, the cable comprising:
a plurality of header connections, the plurality of header connections comprising ground signal paths interposed among data signal paths; and,
a plurality of signal paths, the cable being configured so that signal paths contiguous to at least some of the ground electrical connections are also coupled to the respective grounds on the memory card header and the motherboard header; and wherein
the cable further comprises ground electrical connections which correspond to respective grounds (VSS) on a memory card header and a motherboard header; and
the cable is further configured so that signal paths contiguous to at least some of the ground electrical connections are also coupled to the respective grounds on the memory card header and the motherboard header.

10. The cable of claim 9 wherein:
the cable conforms to an IDE disk drive type cable.

11. The cable of claim 9 wherein:
the cable conforms to an ultra AT attachment (U-ATA) type cable.

12. The cable of claim 9 wherein:
the cable functions with both a standard flash memory card socket as well as a high speed flash memory card socket.

13. The cable of claim 9 wherein:
the cable further comprises ground electrical connections which correspond to respective grounds (VSS) on a memory card header and a motherboard header.

* * * * *